(12) United States Patent
Yang

(10) Patent No.: US 11,934,702 B2
(45) Date of Patent: Mar. 19, 2024

(54) COMPUTING SYSTEM FOR OPTIMAL WRITE AND METHOD OF OPERATING THE SAME

(71) Applicant: SK hynix Inc., Gyeonggi-do (KR)

(72) Inventor: Soon Yeal Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/843,081

(22) Filed: Jun. 17, 2022

(65) Prior Publication Data

US 2022/0405017 A1    Dec. 22, 2022

Related U.S. Application Data

(60) Provisional application No. 63/212,349, filed on Jun. 18, 2021.

(30) Foreign Application Priority Data

May 26, 2022   (KR) .................. 10-2022-0065009

(51) Int. Cl.
*G06F 3/06*    (2006.01)
*G06F 12/0891*   (2016.01)

(52) U.S. Cl.
CPC ............ *G06F 3/0659* (2013.01); *G06F 3/061* (2013.01); *G06F 3/0656* (2013.01); *G06F 3/0673* (2013.01); *G06F 12/0891* (2013.01); *G06F 2212/1016* (2013.01)

(58) Field of Classification Search
CPC ...... G06F 3/061; G06F 3/0644; G06F 3/0656; G06F 3/0659; G06F 3/0673; G06F 3/0679; G06F 12/0246; G06F 12/0253; G06F 12/0866; G06F 12/0891; G06F 2212/1016
See application file for complete search history.

(56) References Cited

U.S. PATENT DOCUMENTS

2018/0121121 A1* 5/2018 Mehra .................. G06F 3/061
2020/0356307 A1* 11/2020 Subbarao ........... G06F 12/0246

FOREIGN PATENT DOCUMENTS

KR   10-2019-0141070 A   12/2019
KR   10-2022-0014212 A   2/2022

* cited by examiner

*Primary Examiner* — Larry T MacKall
(74) *Attorney, Agent, or Firm* — IP & T GROUP LLP

(57) ABSTRACT

The present technology relates to an electronic device. According to the present technology, a computing system may include a storage device and a host. The storage device may include a plurality of zones. The host may receive storage area information including an optimal write size of an open zone among the plurality of zones from the storage device, determine a target size of data to be flushed to the storage device based on the optimal write size, a history size that is a size of data previously flushed to the storage device, and a buffer data of the host, and flush data having the target size among the buffer data to the storage device.

20 Claims, 16 Drawing Sheets

COMPUTING SYSTEM FOR OPTIMAL WRITE AND METHOD OF OPERATING THE SAME

CROSS-REFERENCE TO RELATED APPLICATION

The present application claims benefit under 35 U.S.C. § 119(e) of U.S. Provisional Application No. 63/212,349, filed on Jun. 18, 2021 and Korean patent application number 10-2022-0065009, filed on May 26, 2022, the entire disclosure of which is incorporated by reference herein.

BACKGROUND

1. Field of Invention

The present disclosure relates to an electronic device, and more particularly, to a computing system and a method of operating the same.

2. Description of Related Art

A storage device is a device that stores data under control of a host device such as a computer or a smartphone. A storage device may include a memory device in which data is stored and a memory controller controlling the memory device. The memory device is divided into a volatile memory device and a nonvolatile memory device.

The volatile memory device is a device that stores data only when power is supplied and loses the stored data when the power supply is cut off. The volatile memory device includes a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an erasable programmable ROM (EPROM), an electrically erasable and programmable ROM (EEPROM), a flash memory, and the like.

A host may receive information on an optimal write size of a zone in which a sequential write is performed from the storage device, and may flush write data to the storage device by adjusting a size so that a write operation of data having the optimal write size is performed in the storage device. The storage device may receive the write data having the optimal write size of the zone from the host and immediately program the write data, thereby reducing a cost due to write buffer management.

SUMMARY

An embodiment of the present disclosure provides a computing system and a method of operating the same, in which a host adjusts a size of write data and flushes the write data so that a storage device performs a write operation corresponding to an optimal write size of a zone, thereby increasing write performance.

According to an embodiment of the present disclosure, a computing system may include a storage device and a host. The storage device may include a plurality of zones. The host may receive storage area information including an optimal write size of an open zone among the plurality of zones from the storage device, determine a target size of data to be flushed to the storage device based on the optimal write size, a history size that is a size of data previously flushed to the storage device, and a buffer data of the host, and flush data having the target size among the buffer data to the storage device.

According to an embodiment of the present disclosure, a method of operating a host that controls a storage device including a plurality of zones may include receiving storage area information including an optimal write size of an open zone among the plurality of zones from the storage device, determining a target size of data to be flushed to the storage device based on the optimal write size, a history size that is a size of data previously flushed to the storage device, and a size of buffer data of the host, and flushing data having the target size among the buffer data to the storage device.

According to an embodiment of the present disclosure, an operating method for a host device may comprise buffering data while a size of the buffered data stays expressed as the following Equation 1, and flushing, into a storage device, at least a part of the buffered data. Wherein a size of the part is an amount expressed as the following Equation 2: [Equation 1] $A > B$, where 'A' represents a size of data that can be flushed into the storage device within an optimal write capacity of the storage device, A being C-D, 'B' represents the size of the buffered data, 'C' represents the optimal write capacity, 'D' represents the size of data that is previously flushed from the buffer into the storage device within the optimal write capacity, D being E mod C, and 'E' represents a size of data that is previously flushed from the buffer into the storage device, and [Equation 2] $A \leq F \leq B$ while $A \leq B$, where 'F' represents the size of the part.

According to the present technology, a computing system and a method of operating the same, in which a host adjusts a size of write data and flushes the write data so that a storage device performs a write operation corresponding to an optimal write size of a zone, thereby increasing write performance, are provided.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
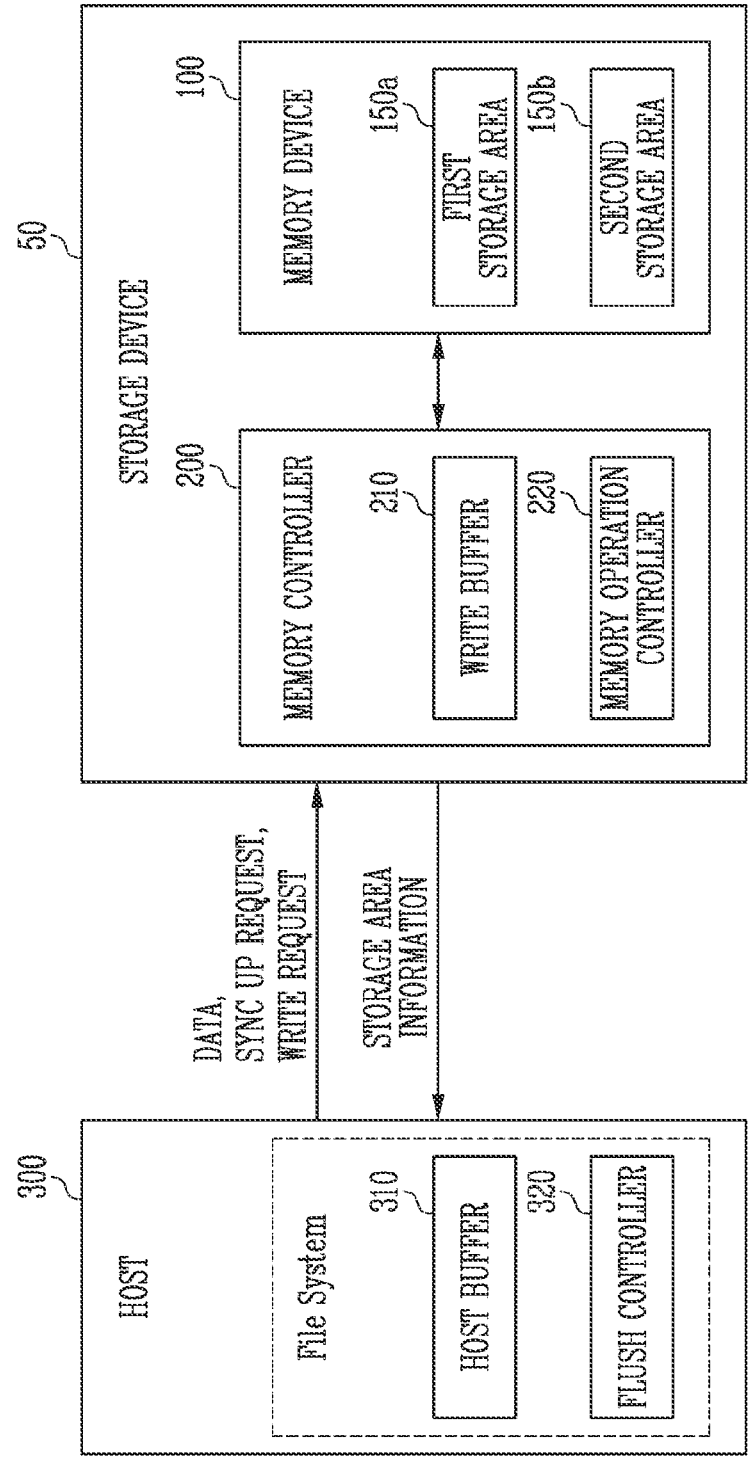
FIG. 1 is a diagram illustrating a computing system according to an embodiment of the present disclosure.

FIG. 1 is a diagram illustrating a computing system according to an embodiment of the present disclosure.

Referring to FIG. 1, the computing system may include a storage device 50 and a host 300.

The storage device 50 may include a memory device 100 and a memory controller 200 that controls an operation of the memory device. The storage device 50 is a device that stores data under control of the host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any of various types of storage devices such as an SSD, a multi-media card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array including a plurality of memory cells that store data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address of the memory cell array. That is, the memory device 100 may perform an operation instructed by the command on the area selected by the address. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

In an embodiment, the memory device 100 may include a first storage area 150a and a second storage area 150b. The first storage area 150a may include a plurality of zones in which a sequential write operation is performed. Since data corresponding to successive logical addresses is stored in each zone, garbage collection may not be performed. An optimal write size may be set for each zone. The optimal write size may be a maximum size of data written by one program operation. When data having an optimal write size of an open zone is flushed from the host 300 to the storage device 50, the storage device 50 may program directly to the open zone without need to maintain flushed data from a write buffer 210 for a long time, thereby reducing a maintenance and management cost of the write buffer 210.

The second storage area 150b may include a plurality of zone buffers corresponding to the plurality of respective zones. The zone buffer may include a memory cell that stores fewer data bits than a memory cell included in the zone. For example, the zone may include a TLC that stores three data bits. The zone buffer may include an SLC that stores one data bit. Since the number of data segments bits stored in each memory cell of the zone buffer is less than that of the zone, although a capacity is small, read and write speeds may be fast and reliability may be high.

The zone buffer may be used to temporarily store data when data to be stored in the zone from the write buffer 210 is less than a preset write size. The preset write size may include the optimal write size.

The memory controller 200 controls an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the LBA into a physical block address (PBA) indicating an address of memory cells in which data included in the memory device 100 is to be stored.

The memory controller 200 may control the memory device 100 to perform the program operation, the read operation, or the erase operation in response to a request of the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host 300. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. In this case, the memory controller 200 may control the memory devices 100 according to an interleaving method to improve operation performance. The interleaving method may be an operation method for overlapping operation periods of at least two memory devices 100.

The memory controller 200 may control a plurality of memory devices 100 connected through at least one or more channels. Each memory device 100 may include at least one or more planes. Each plane may include a plurality of memory blocks.

In an embodiment, the memory controller 200 may include the write buffer 210 and a memory operation controller 220.

The write buffer 210 may store data flushed from the host 300. The data stored in the write buffer 210 may be programmed to the zone of the first storage area 150a or the zone buffer of the second storage area 150b.

The memory operation controller 220 may provide storage area information including information on the optimal write size of the open zone included in the first storage area 150a to the host 300. The open zone may be a zone activated for data writing among a plurality of zones.

The memory operation controller 220 may store the data flushed from the host 300 in the write buffer 210, and program the data stored in the write buffer 210 to the open zone of the first storage area 150a or the zone buffer corresponding to the open zone of the second storage area 150b. Specifically, the memory operation controller 220 may program the data stored in the write buffer 210 to the open zone or the zone buffer corresponding to the open zone based on a comparison result of the optimal write size and a size of the data stored in the write buffer 210.

The memory operation controller 220 may compare the size of the data stored in the write buffer 210 with the optimal write size in response to a write request received from the host 300. When the size of the data stored in the write buffer 210 is greater than or equal to the optimal write size, the memory operation controller 220 may program the data having the optimal write size among the data stored in the write buffer 210 to the open zone. When the size of the data stored in the write buffer 210 is less than the optimal write size, the memory operation controller 220 may wait without programming the data stored in the write buffer 210 to the open zone until the size of the data stored in the write buffer 210 is greater than or equal to the optimal write size, due to data newly flushed from the host 300 to the write buffer 210.

The memory operation controller 220 may program the data stored in the write buffer 210 to the zone buffer corresponding to the open zone in response to a sync up request received from the host 300. Since the sync up request is a request for synchronizing the storage device 50 and the host 300, the memory operation controller 220 may program the data to the zone buffer even though a size of the stored in the write buffer 210 is less than the optimal write size.

The memory operation controller 220 may load the data stored in the zone buffer to the write buffer 210 again after performing an operation according to the sync up request. The memory operation controller 220 may program the data having the optimal write size to the open zone, in data including the data loaded to the write buffer 210 and the data newly flushed from the host 300 to the write buffer 210.

The host 300 may communicate with the storage device using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

In an embodiment, the host 300 may include a host buffer 310 and a flush controller 320.

The host buffer 310 may store buffer data to be flushed to the storage device 50.

The flush controller 320 may receive the storage area information including the optimal write size of the open zone included in the first storage area 150a from the storage device 50. The flush controller 320 may determine a target size of data to be flushed to the storage device 50 based on a history size, which includes at least one of a size of data previously flushed to the storage device 50, a size of the buffer data stored in the host buffer 310, and the optimal write size.

For example, the flush controller 320 may set the target size based on the history size and the optimal write size. The flush controller 320 may set a value obtained by subtracting the history size from the optimal write size as an initial value of the target size.

The flush controller 320 may adjust the target size based on a comparison result of the target size and the size of the buffer data. When the size of the buffer data is less than the target size, the flush controller 320 may initialize a value of the target size. When the size of the buffer data is the same as the target size, the flush controller 320 may maintain the value of the target size. When the size of the buffer data is greater than the target size, the flush controller 320 may adjust the value of the target size to a value obtained by adding an integer multiple of the optimal write size and the initial value of the target size within a size of the buffer data.

The flush controller 320 may flush data having the target size among the buffer data stored in the host buffer 310 to the storage device 50 together with the write request. The flush controller 320 may update the history size after the flush.

The flush controller 320 may provide the sync up request to the storage device 50 in response to the sync up event for synchronizing the host 300 and the storage device 50. The flush controller 320 may flush the buffer data stored in the host buffer 310 to the storage device 50 together with the sync up request.

In an embodiment, data processed by the host 300 may be managed through a file system. The file system may include a log structure file system. The flush controller 320 may be controlled by the log structure file system.

Figure 2:
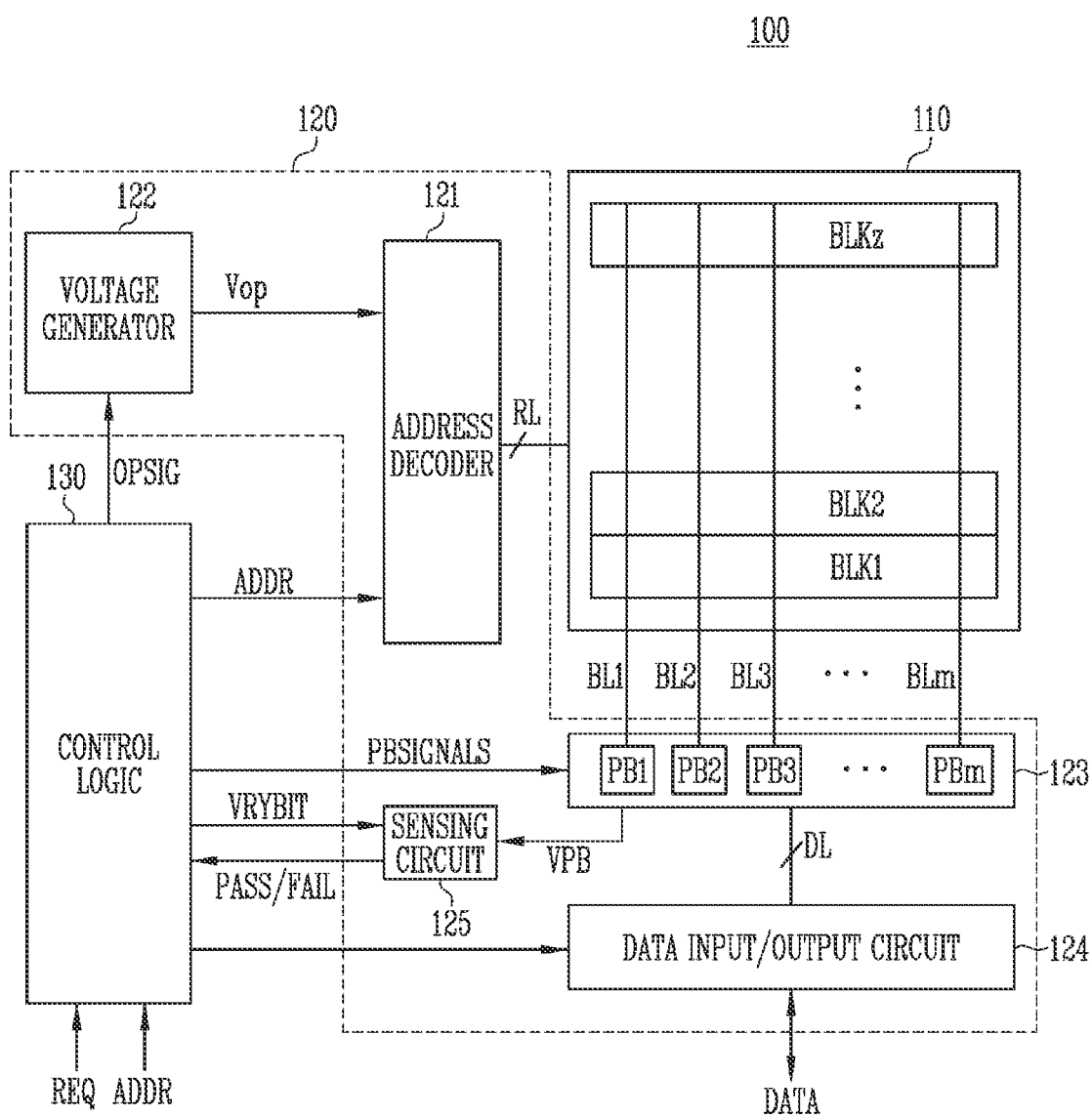
FIG. 2 is a diagram illustrating a structure of a memory device of FIG. 1 according to an embodiment of the present disclosure.

FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. In an embodiment, the plurality of memory cells are nonvolatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells, and between a source select transistor and the memory cells.

Each of the memory cells of the memory device 100 may be configured as an SLC that stores one data bit, an MLC that stores two data bits, a TLC that stores three data bits, or a QLC that stores four data bits.

The peripheral circuit 120 may include an address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address of the received address ADDR. The address decoder 121 may select at least one word line among word lines of a selected memory block according to the decoded address. The address decoder 121 may apply an operation voltage Vop received from the voltage generator 122 to the selected word line.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in a memory block unit. The address ADDR input to the memory device 100 during the erase operation includes a block address. The address decoder 121 may decode the block address and select at least one memory block according to the decoded block address. During the erase operation, the address decoder 121 may apply a ground voltage to the word lines input to the selected memory block.

According to an embodiment of the present disclosure, the address decoder 121 may be configured to decode a column address of the transferred address ADDR. The decoded column address may be transferred to the read and write circuit 123. As an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop. The plurality of generated operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of a program operation, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL and store the read data DATA in the first to m-th page buffers PB1 to PBm.

During the erase operation, the read and write circuit 123 may float the bit lines BL. In an embodiment, the read and write circuit 123 may include a column select circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transferred from the first to m-th page buffers PB1 to PBm included in the read and write circuit 123 to the external controller.

During the read operation or the verify operation, the sensing circuit 125 may generate a reference current in response to a signal of an allowable bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transferred from an external device.

The control logic 130 may generate various signals in response to the command CMD, the request REQ and the address ADDR to control the peripheral circuit 120. The request REQ is a request received from a memory controller. For example, the control logic 130 may generate an operation signal OPSIG, the address ADDR, a read and write circuit control signal PBSIGNALS, and the allowable bit VRYBIT in response to the command CMD and the address ADDR. The control logic 130 may output the operation signal OPSIG to the voltage generator 122, output the address ADDR to the address decoder 121, output the read and write control signal to the read and write circuit 123, and output the allowable bit VRYBIT to the sensing circuit 125. In addition, the control logic 130 may determine whether the verify operation has passed or failed in response to the pass or fail signal PASS/FAIL output by the sensing circuit 125.

Figure 3:
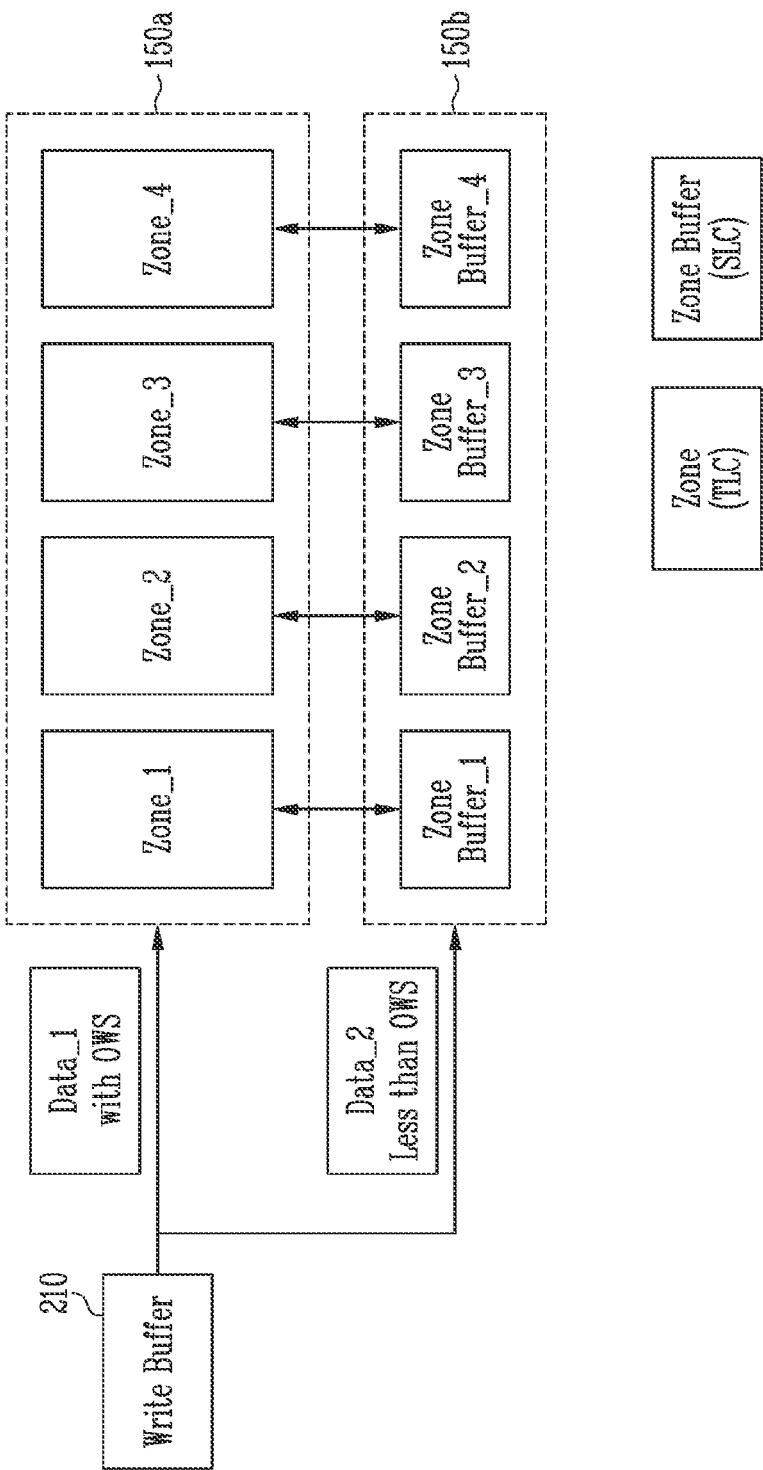
FIG. 3 is a diagram illustrating a configuration and an operation of the memory device of FIG. 1 according to an embodiment of the present disclosure.

FIG. 3 is a diagram illustrating a configuration and an operation of the memory device of FIG. 1 according to an embodiment of the present disclosure.

Referring to FIG. 3, the memory device may include the first storage area 150a and the second storage area 150b. The first storage area 150a may include first to fourth zones Zone_1 to Zone_4 in which a sequential write operation is performed. Data corresponding to the successive logical addresses may be stored in each zone. An optimal write size (OWS) may be set for each zone. The OWS may be the maximum size of the data programmed to the zone by one program operation.

The second storage area 150b may include first to fourth zone buffers Zone Buffer_1 to Zone Buffer_4 respectively corresponding to the first to fourth zones Zone_1 to Zone_4. A memory cell included in the zone buffer may have fewer data bits stored per memory cell than a memory cell included in the zone. Since the number of data segments bits stored in each memory cell of the zone buffer is less than that of the zone, although the capacity is small, the read and write speeds may be fast and the reliability may be high.

In an embodiment, data having the OWS among the data stored in the write buffer 210 may be programmed to the open zone among a plurality of zones included in the first storage area 150a. The open zone may be a zone activated for data writing among the plurality of zones.

When a size of data stored in the write buffer 210 is less than the OWS, the data stored in the write buffer 210 may be held in the write buffer 210 without being programmed to the first storage area 150a or the second storage area 150b until the data stored in the write buffer 210 is greater than or equal to the OWS. However, even though the size of the data stored in the write buffer 210 is less than the OWS, when the sync up request for synchronizing the storage device and the host is received, the data stored in the write buffer 210 may be programmed to the zone buffer corresponding to the open zone.

That is, data having a size less than the OWS may be temporarily programmed to the zone buffer. Thereafter, the data programmed to the zone buffer may be loaded to the write buffer 210 again and may be programmed to the open zone as the data having the OWS together with the data newly flushed from the host to the write buffer 210.

Figure 4:
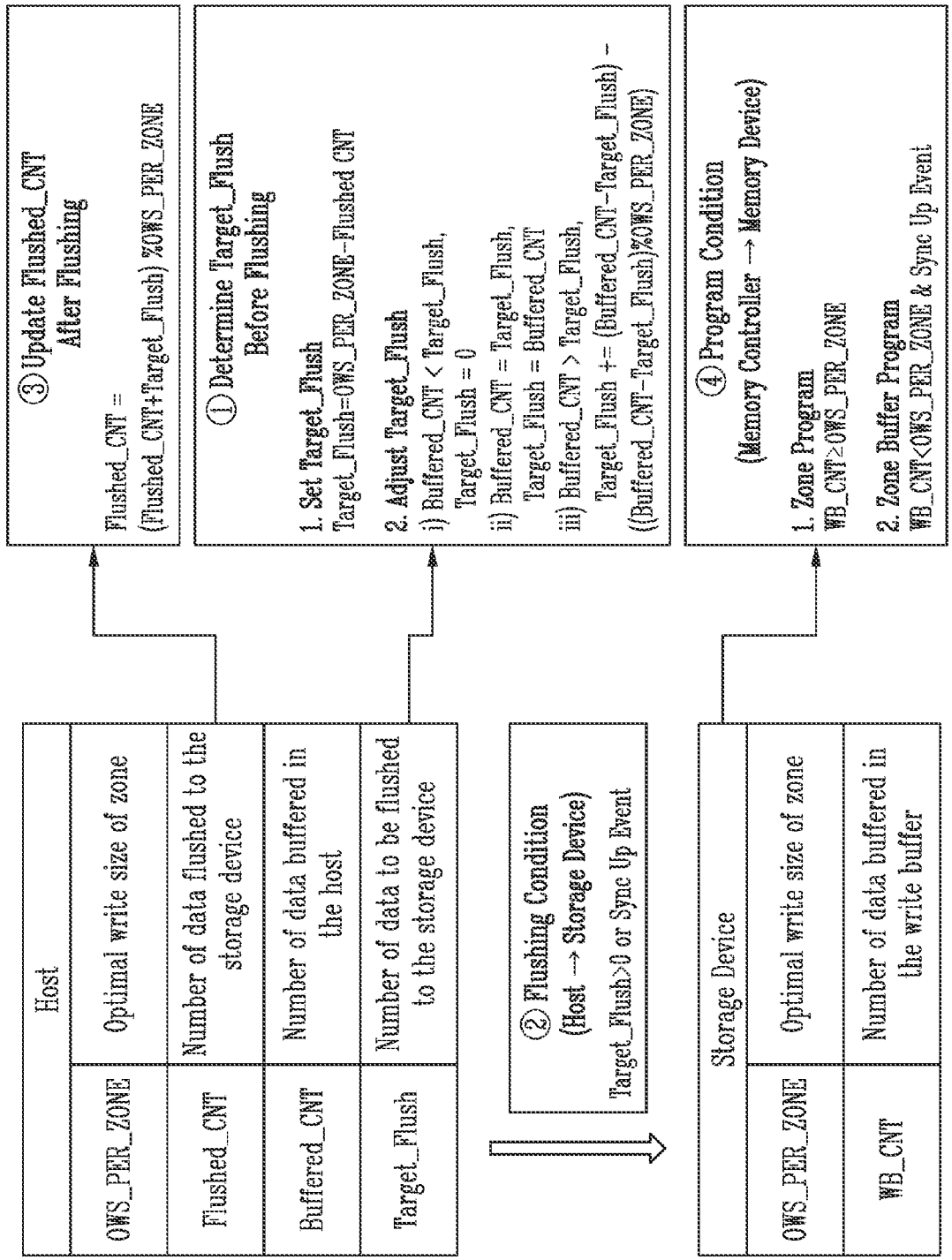
FIG. 4 is a diagram illustrating information managed by a host and a storage device to support a write operation corresponding to an optimal write size according to an embodiment of the present disclosure.

FIG. 4 is a diagram illustrating information managed by the host and the storage device to support a write operation having the optimal write size according to an embodiment of the present disclosure.

Referring to FIG. 4, the information managed by the host may include OWS_PER_ZONE, Flushed_CNT, Buffered_CNT, and Target_Flush.

OWS_PER_ZONE may be the optimal write size of the open zone. The optimal write size may be the maximum size of data written in one program operation for the open zone. The host may obtain OWS_PER_ZONE from the storage area information received from the storage device.

Flushed_CNT may be the number of data segments with a preset size that are previously flushed to the storage device, and may indicate the history size that is the size of the data previously flushed to the storage device. Flushed_CNT may have a value from 0 to (OWS_PER_ZONE-1).

Buffered_CNT may be the number of data segments with a preset size stored in the host buffer, and may indicate the size of the buffer data.

Target_Flush may be the number of data segments with a preset size to be flushed to the storage device, and may indicate the target size of the data to be flushed to the storage device.

The information managed by the storage device may include OWS_PER_ZONE and WB_CNT.

WB_CNT may be the number of data segments with a preset size stored in the write buffer, and may indicate the size of the data stored in the write buffer.

According to the embodiment of FIG. 4, Target_Flush may be determined before flush is performed. An initial value of Target_Flush may be set based on OWS_PER_ZONE and Flushed_CNT. Thereafter, a value of Target_Flush may be adjusted according to a comparison result of Buffered_CNT and the initial value of Target_Flush. After a value of Target_Flush is determined, when the value of Target_Flush is greater than 0 or a sync up event occurs, the host may flush the data stored in the host buffer to the storage device. The host may update Flushed_CNT after the flush. In FIG. 4, an arithmetic symbol '%' may an arithmetic symbol 'mod'.

The storage device may program the data stored in the write buffer to the open zone or to the zone buffer corresponding to the zone according to the comparison result of WB_CNT and OWS_PER_ZONE. For example, when WB_CNT is greater than or equal to OWS_PER_ZONE, the storage device may program the data stored in the write buffer to the open zone. The storage device may program the data stored in the write buffer to the zone buffer when WB_CNT is less than OWS_PER_ZONE and a sync up event condition is satisfied.

Figure 5:
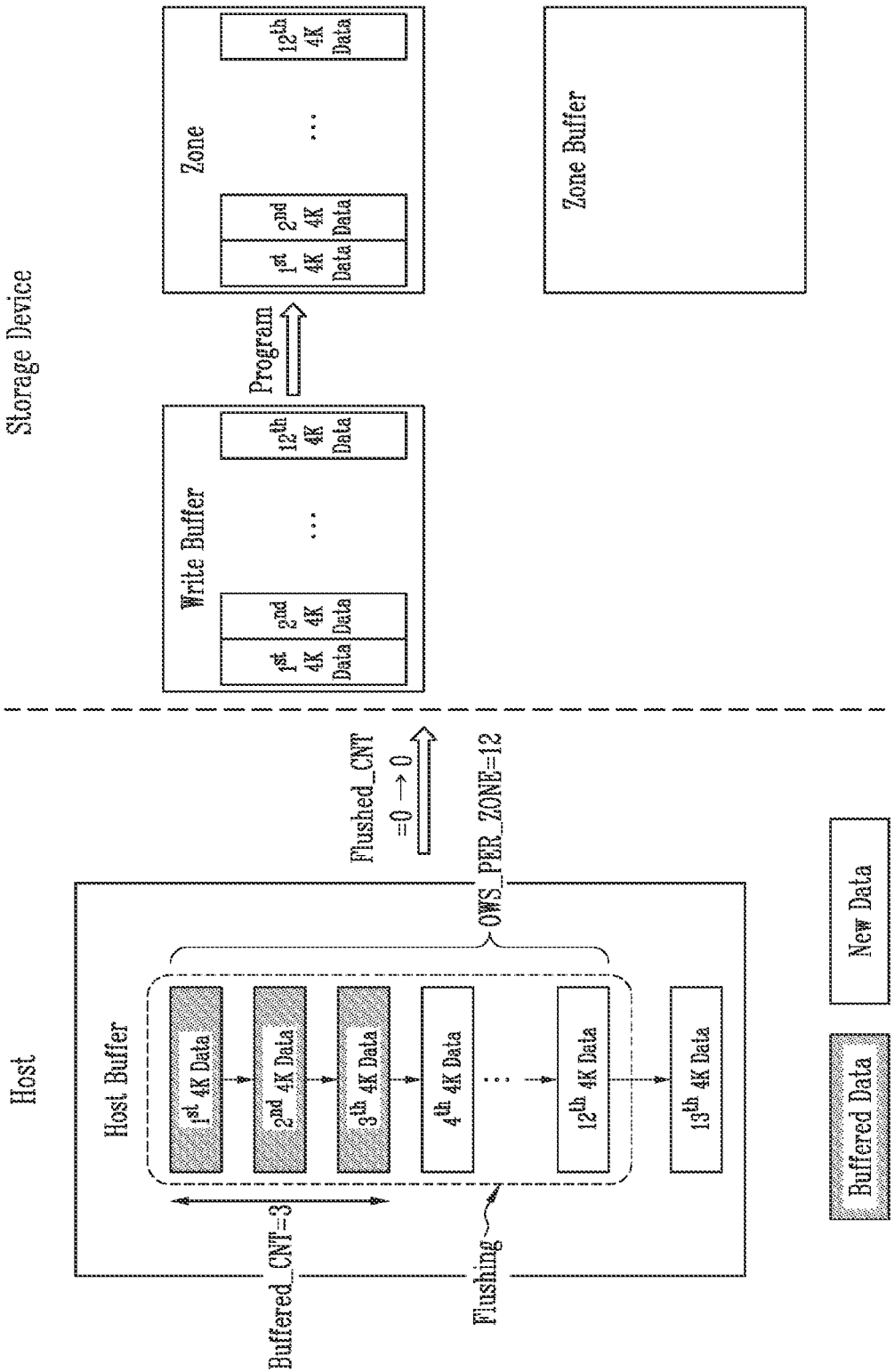
FIG. 5 is a diagram illustrating a program operation for a zone according to an embodiment of the present disclosure.

FIG. 5 is a diagram illustrating a program operation for a zone according to an embodiment.

Referring to FIG. 5, Flushed_CNT may be initially set to 0. A range of Flushed_CNT may be from 0 to (OWS_PER_ZONE-1). First to third data having a unit size of 4 Kbye may be stored in the host buffer. Therefore, Buffered_CNT may be 3. In FIG. 5, OWS_PER_ZONE may be 12. The unit size of data, the number of data segments stored in the host buffer, and the optimal write size of the open zone are not limited to the present embodiment.

Fourth to thirteenth data may be newly stored in the host buffer. Buffered_CNT may be updated from 3 to 13.

Target_Flush may be initially set to 12 (i.e., the flushable size) by OWS_PER_ZONE and Flushed_CNT. According to a comparison result of Buffered_CNT and an initial value of Buffered_CNT, Target_Flush may be determined as 12. Since Target_Flush is greater than 0, a flush condition may be satisfied. First to twelfth data of Target_Flush may be flushed from the host to the write buffer of the storage device. After the flush, Flushed_CNT may be updated. Flushed_CNT maintain 0 as a result of the update. Since WB_CNT is equal to OWS_PER_ZONE, the first to twelfth data flushed to the write buffer may be programmed to the open zone.

FIG. 5 illustrates a flush operation of the host and a program operation of the storage device in a general situation. The host may adjust the size of the data to be flushed in consideration of the size of the data previously flushed to the storage device. By receiving the data having the optimal write size from the host, the storage device may directly perform the program operation on the open zone without holding the data flushed from the host in the write buffer. Accordingly, the maintenance and management cost of the write buffer may be reduced, and write performance of the storage device may be improved.

Figure 6A:
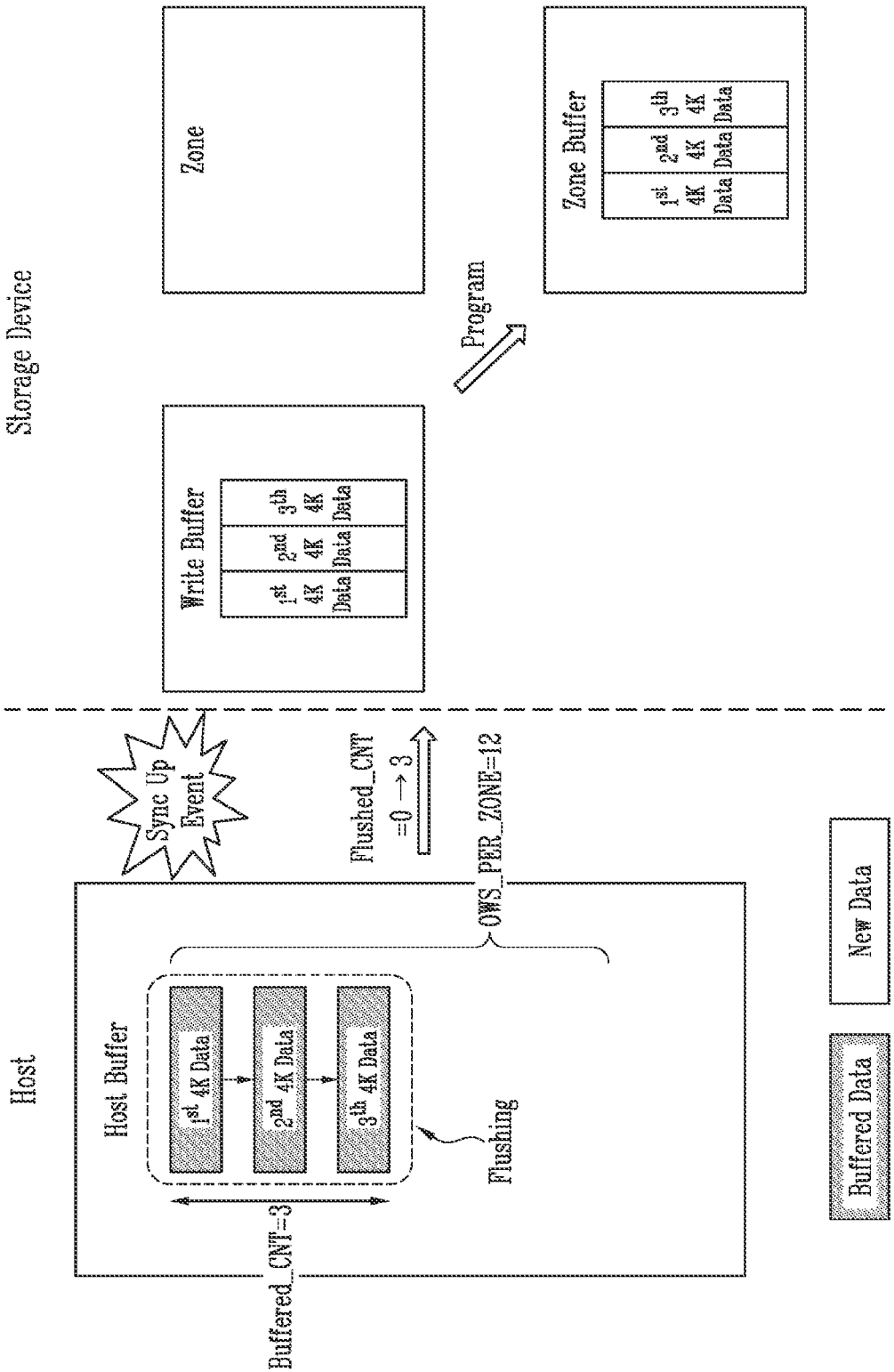
FIG. 6A is a diagram illustrating a program operation for a zone buffer according to an embodiment of the present disclosure.

FIG. 6A is a diagram illustrating a program operation for a zone buffer according to an embodiment of the present disclosure. Referring to FIG. 6A, Flushed_CNT may be initially set to 0. The range of Flushed_CNT may be from 0 to (OWS_PER_ZONE-1). The first to third data having a unit size of 4K bytes may be stored in the host buffer. Therefore, Buffered_CNT may be 3. In FIG. 6A, OWS_PER_ZONE may be 12. The unit size of data, the number of data segments stored in the host buffer, and the optimal write size of the open zone are not limited to the present embodiment.

Target_Flush may be set to 12 (i.e., the flushable size) by OWS_PER_ZONE and Flushed_CNT. According to a comparison result of Buffered_CNT and an initial value of Target_Flush, Target_Flush may be determined as 0. Although Target_Flush is not greater than since the sync up event for synchronizing the storage device and the host occurs, the flush condition may be satisfied. The first to third data of Buffered_CNT may be flushed from the host to the write buffer of the storage device. After the flush, Flushed_CNT may be updated from 0 to 3. Since WB_CNT is less than OWS_PER_ZONE, the first to third data flushed to the write buffer may be programmed to the zone buffer corresponding to the open zone. Buffered_CNT may be updated from 3 to 0.

FIG. 6A illustrates a flush operation of the host and a program operation of the storage device in a sync up event situation. When the sync up event occurs, regardless of Target_Flush, the data stored in the host is required to be programmed to the storage device. Therefore, even though the size of the data flushed from the host is less than the optimal write size, the data is required to be programmed, and the data stored in the write buffer may be temporarily programmed to the zone buffer. This is because, when data less than the optimal write size is programmed to the open zone, a continuity of the sequential write operation may be broken. Furthermore, since the number of data segments bits stored for each memory cell of the zone buffer is less than that of the zone, faster read and write operations may be possible, and a faster response to the sync up event may be possible.

Figure 6B:
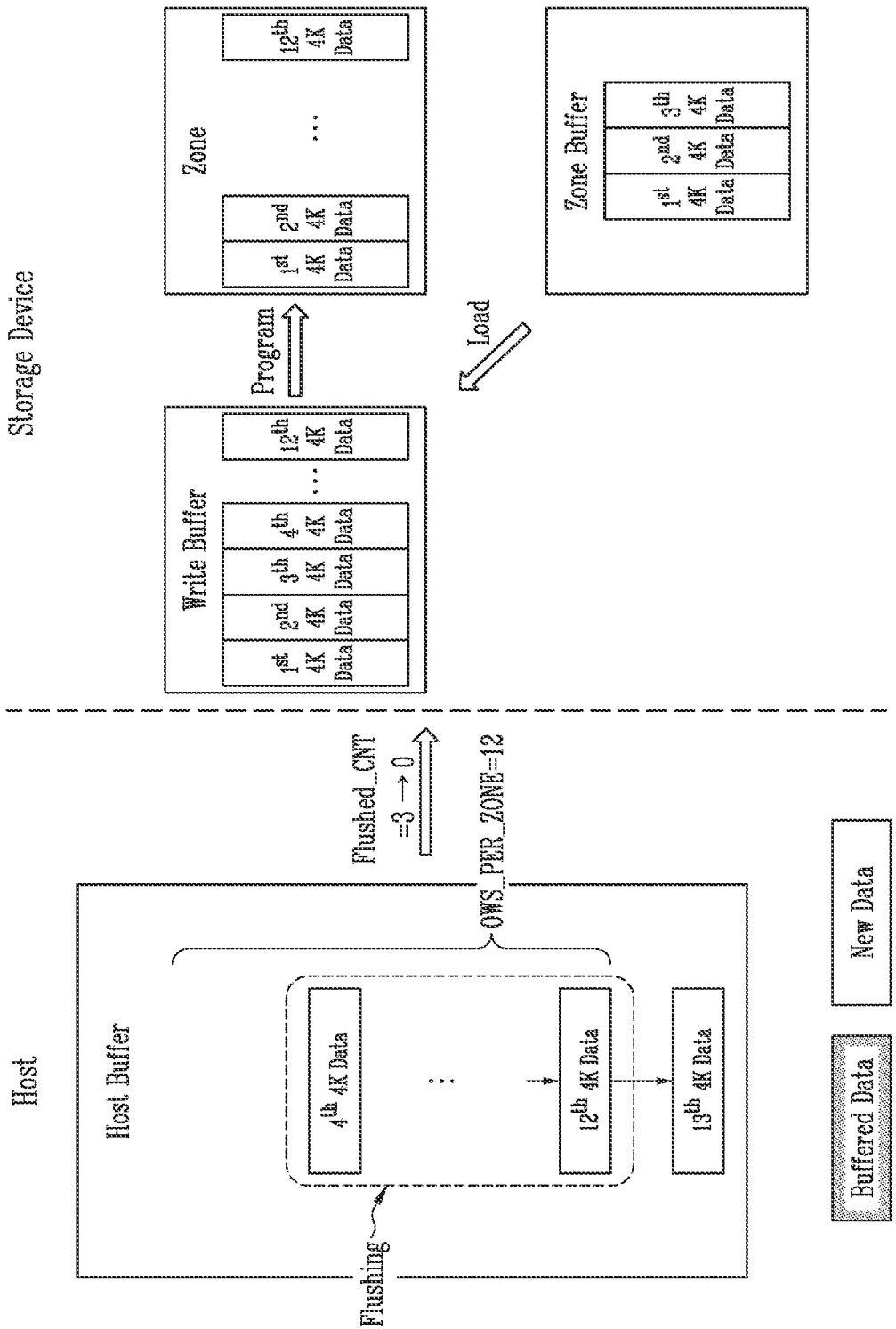
FIG. 6B is a diagram illustrating an operation of programming data stored in a zone buffer to a zone according to an embodiment of the present disclosure.

FIG. 6B is a diagram illustrating an operation of programming data stored in a zone buffer to a zone according to an embodiment of the present disclosure.

Referring to FIGS. 6A and 6B, after the sync up event, the first to third data stored in the zone buffer may be loaded to the write buffer again.

Fourth to thirteenth data may be newly stored in the host buffer. Buffered_CNT may be updated from 0 to 10.

Target_Flush may be set to 9 (i.e., the flushable size) by OWS_PER_ZONE and Flushed_CNT. According to a comparison result of Buffered_CNT and the initial value of Target_Flush, Target_Flush may be determined as 9. Since Target_Flush is greater than 0, the flush condition may be satisfied. Fourth to twelfth data of Target_Flush may be flushed from the host to the write buffer of the storage device. Thereafter, Flushed_CNT may be updated from 3 to 0.

Since WB_CNT is equal to OWS_PER_ZONE, the first to third data loaded to the write buffer and the fourth to twelfth data flushed to the write buffer may be programmed to the open zone.

Through the embodiment described with reference to FIGS. 6A and 6B, even though the sync up event occurs, the sequential write operation of programming the data having the optimal write size to the open zone may be maintained.

Figure 7:
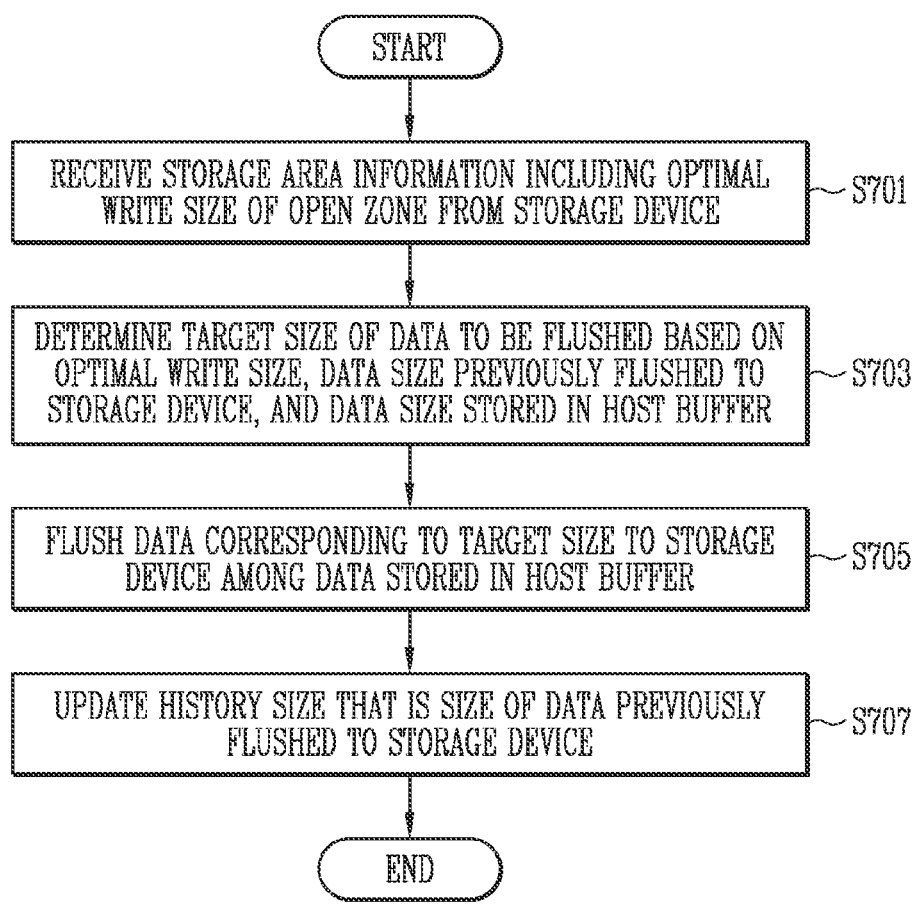
FIG. 7 is a flowchart illustrating a method of operating a host according to an embodiment of the present disclosure.

FIG. 7 is a flowchart illustrating a method of operating a host according to an embodiment of the present disclosure.

Referring to FIG. 7, in operation S701, the host may receive the storage area information including the optimal write size of the open zone from the storage device.

In operation S703, the host may determine the target size of the data to be flushed based on the optimal write size, the data size flushed to the storage device, and the data size stored in the host buffer.

In operation S705, the host may flush the data having the target size among the data stored in the host buffer to the storage device.

In operation S707, the host may update the history size, which is the size of the data previously flushed to the storage device.

Figure 8:
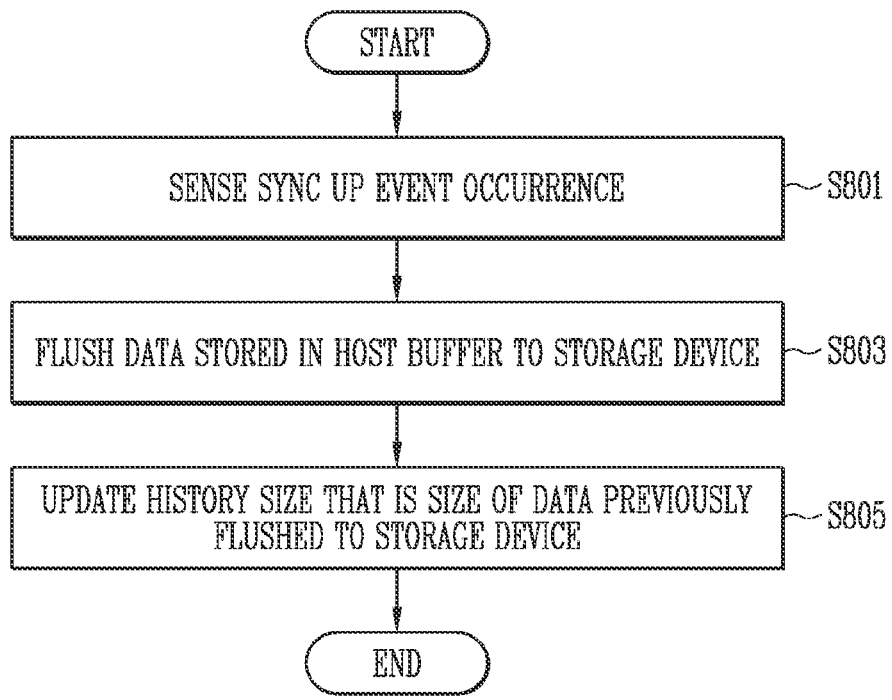
FIG. 8 is a flowchart illustrating a method of operating a host according to an embodiment of the present disclosure.

FIG. 8 is a flowchart illustrating a method of operating a host according to an embodiment of the present disclosure.

Referring to FIG. 8, in operation S801, the host may detect occurrence of the sync up event for synchronizing the host and the storage device.

In operation S803, the host may flush the data stored in the host buffer to the storage device.

In operation S805, the host may update the history size, which is the size of the data previously flushed to the storage device.

Figure 9:
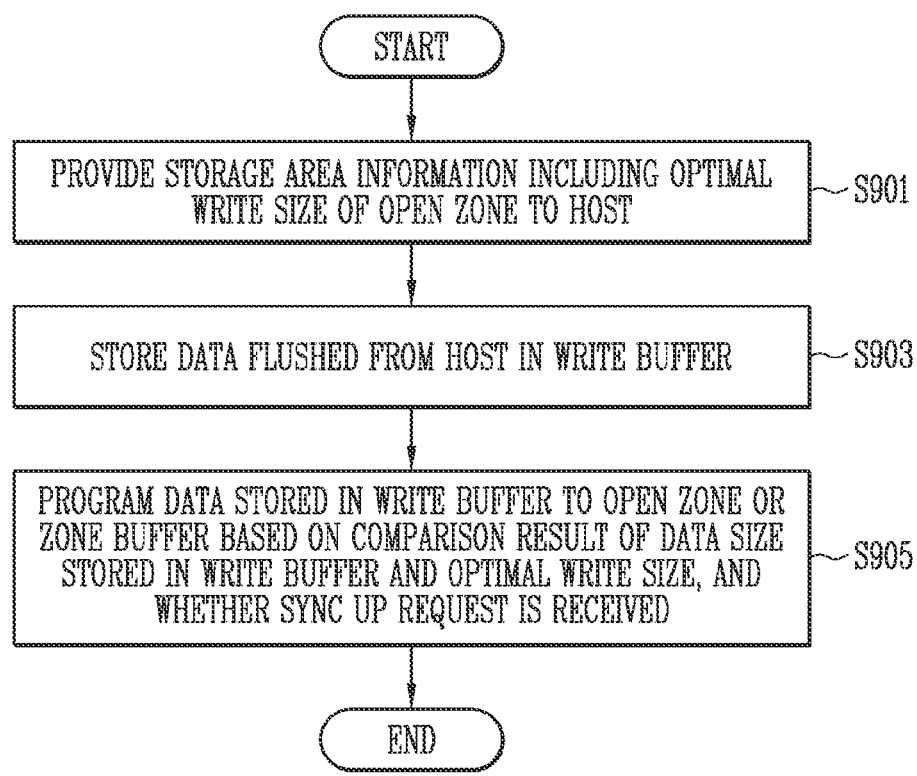
FIG. 9 is a flowchart illustrating a method of operating a storage device according to an embodiment of the present disclosure.

FIG. 9 is a flowchart illustrating a method of operating a storage device according to an embodiment of the present disclosure.

Referring to FIG. 9, in operation S901, the storage device may provide the storage area information including the optimal write size of the open zone to the host.

In operation S903, the storage device may store the data flushed from the host in the write buffer.

In operation S905, the storage device may program the data stored in the write buffer to the open zone or the zone buffer based on the comparison result of the data size stored in the write buffer and the optimal write size and whether the sync up request is received.

Figure 10:
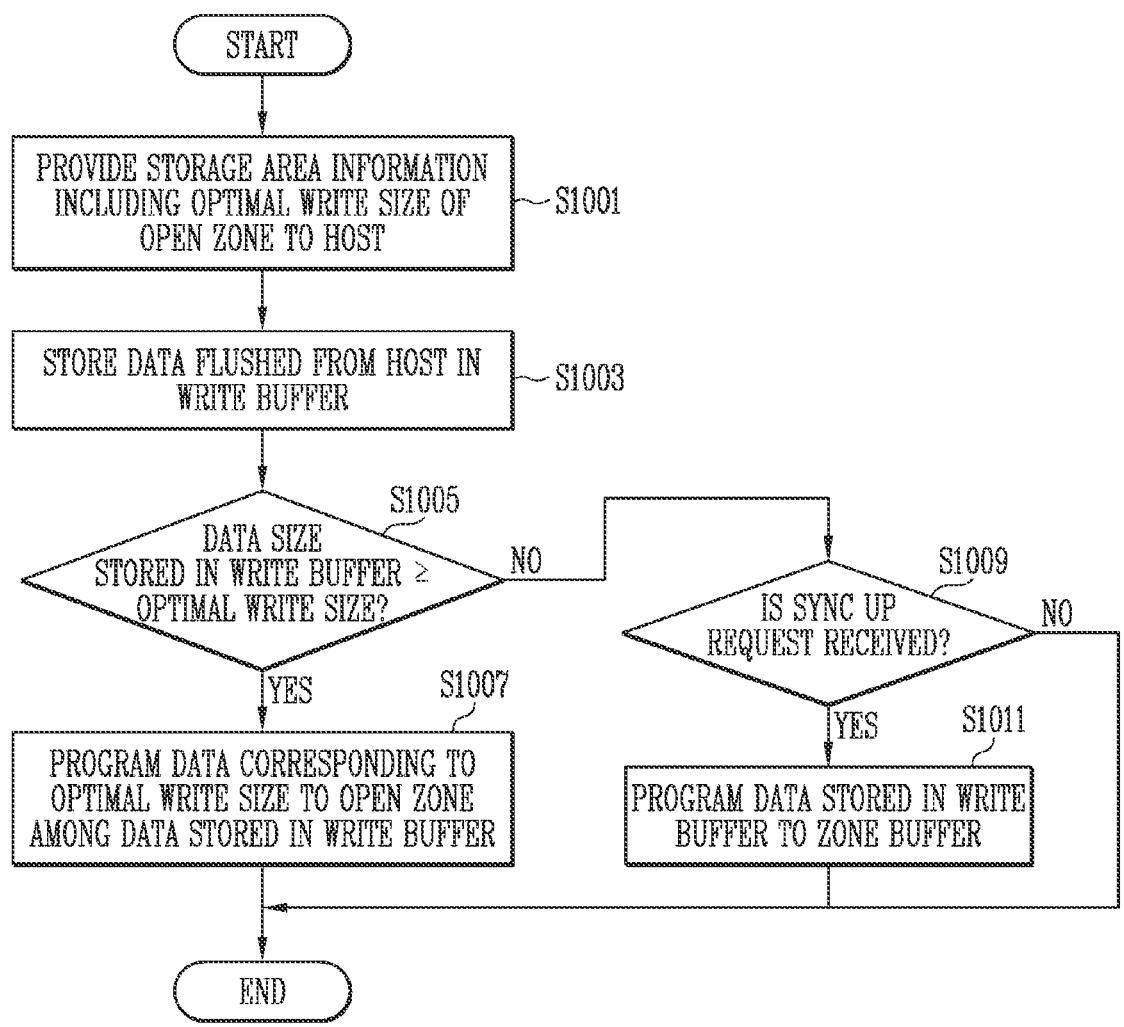
FIG. 10 is a flowchart illustrating a method of operating a storage device according to an embodiment of the present disclosure.

FIG. 10 is a flowchart illustrating a method of operating a storage device according to an embodiment of the present disclosure.

Referring to FIG. 10, in operation S1001, the storage device may provide the storage area information including the optimal write size of the open zone to the host.

In operation S1003, the storage device may store the data flushed from the host in the write buffer.

In operation S1005, the storage device may determine whether the size of the data stored in the write buffer is greater than or equal to the optimal write size. As a result of the determination, when the size of the data stored in the write buffer is greater than or equal to the optimal write size, the operation proceeds to operation S1007, and when the size of the data stored in the write buffer is less than the optimal write size, the operation proceeds to operation S1009.

In operation S1007, the storage device may program the data having the optimal write size among the data stored in the write buffer in the open zone.

In operation S1009, the storage device may determine whether the sync up request is received from the host. As a result of the determination, when the sync up request is received from the host, the operation proceeds to operation S1011, and when the sync up request is not received from the host, the operation is ended.

In operation S1011, the storage device may program the data stored in the write buffer to the zone buffer corresponding to the open zone.

Figure 11:
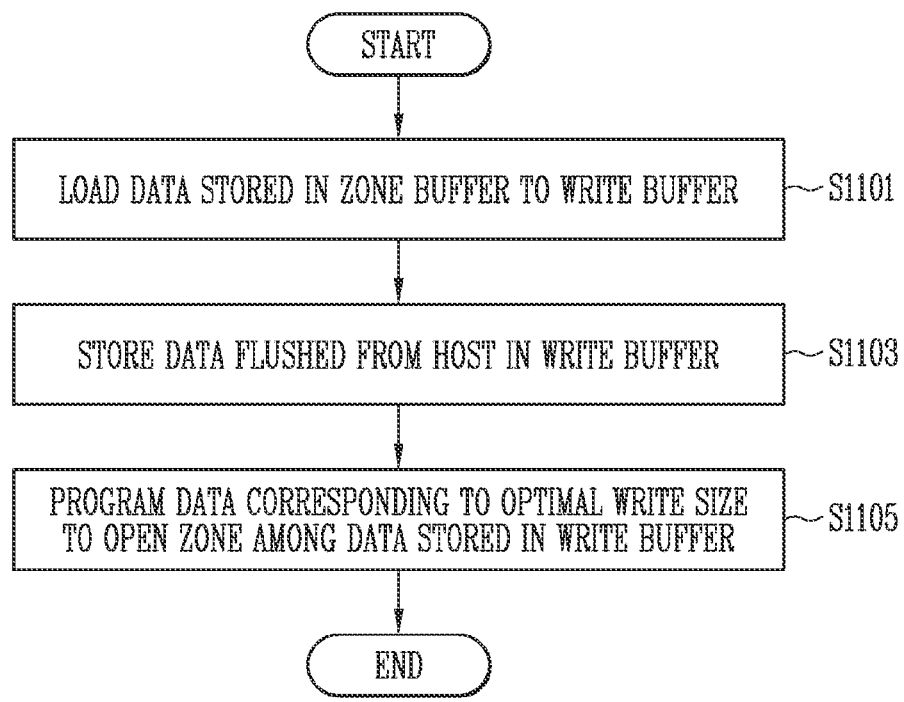
FIG. 11 is a flowchart illustrating a method of operating a storage device according to an embodiment of the present disclosure.

FIG. 11 is a flowchart illustrating a method of operating a storage device according to an embodiment of the present disclosure.

Referring to FIG. 11, in operation S1101, the storage device may load the data stored in the zone buffer to the write buffer.

In operation S1103, the storage device may store the data flushed from the host in the write buffer.

In operation S1105, the storage device may program the data having the optimal write size among the data stored in the write buffer to the open zone. The data stored in the write buffer may include the data loaded from the zone buffer and the data newly flushed from the host.

Figure 12:
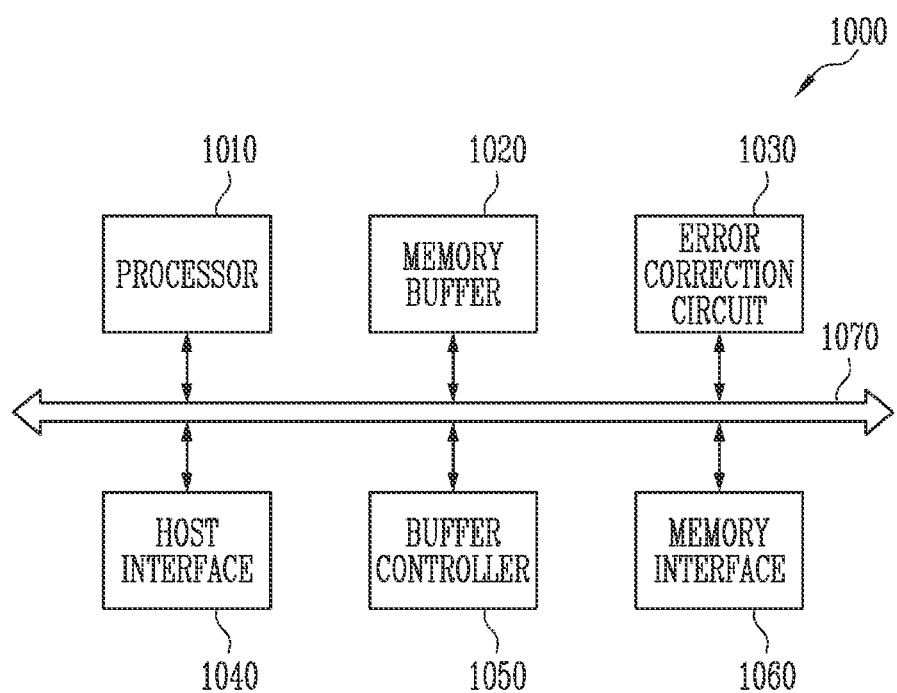
FIG. 12 is a diagram illustrating a memory controller of FIG. 1 according to another embodiment of the present disclosure.

FIG. 12 is a diagram illustrating the memory controller of FIG. 1 according to another embodiment of the present disclosure.

Referring to FIG. 12, the memory controller 1000 is connected to a host and the memory device. The memory controller 1000 is configured to access the memory device in response to a request from the host. For example, the memory controller 1000 is configured to control the write, read, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction circuit (ECC) 1030, a host interface 1040, a buffer controller 1050, a memory interface 1060, and a bus 1070.

The bus 1070 may be configured to provide a channel between components of the memory controller 1000.

The processor 1010 may control an overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of an FTL. The processor 1010 may convert an LBA provided by the host into a PBA through the FTL. The FTL may receive the LBA using a mapping table and convert the LBA into the PBA. An address mapping method of the flash translation layer may include various methods according to a mapping unit. A representative address mapping method includes a page mapping method, a block mapping method, and a hybrid mapping method.

The processor 1010 is configured to randomize data received from the host. For example, the processor 1010 may randomize the data received from the host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host.

In an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The ECC 1030 may perform error correction. The ECC 1030 may perform error correction encoding (ECC encoding) based on data to be written to the memory device through memory interface 1060. The error correction encoded data may be transferred to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 is configured to communicate with an external host under control of the processor 1010. The host interface 1040 may be configured to perform communication using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a nonvolatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1202, and the memory interface 1060.

Figure 13:
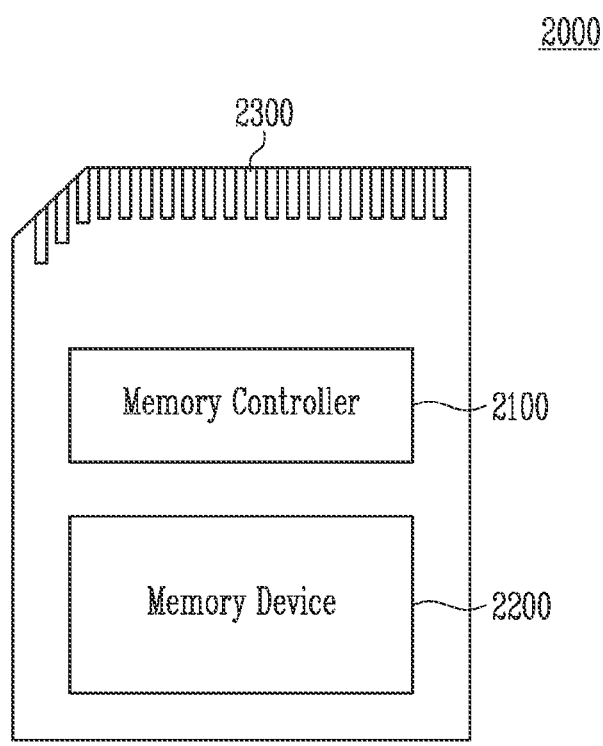
FIG. 13 is a block diagram illustrating a memory card system to which a storage device according to an embodiment of the present disclosure is applied.

FIG. 13 is a block diagram illustrating a memory card system to which a storage device according to an embodiment of the present disclosure is applied.

Referring to FIG. 13, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an ECC.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards or interfaces described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 14:
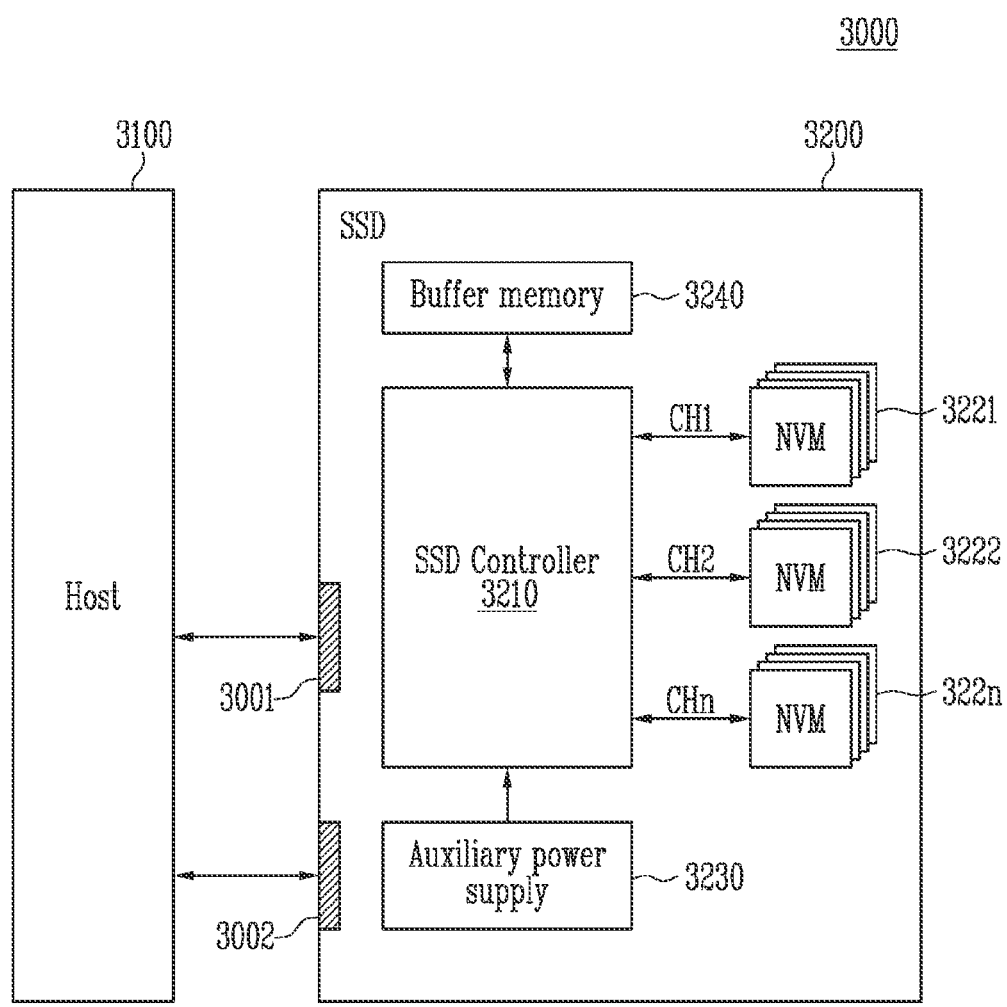
FIG. 14 is a block diagram illustrating a solid state drive (SSD) system to which a storage device according to an embodiment of the present disclosure is applied.

FIG. 14 is a block diagram illustrating a solid state drive (SSD) system to which a storage device according to an embodiment of the present disclosure is applied.

Referring to FIG. 14, the SSD system 3000 includes a host 3100 and an SSD 3200. The SSD 3200 exchanges a signal with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 15:
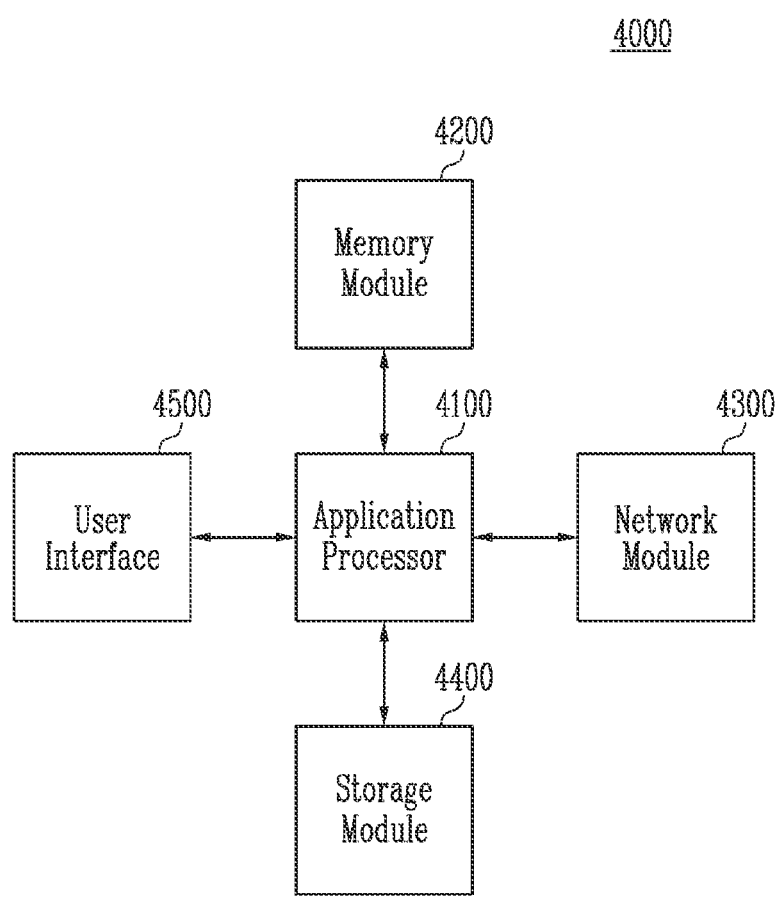
FIG. 15 is a block diagram illustrating a user system to which a storage device according to an embodiment of the present disclosure is applied.

FIG. 15 is a block diagram illustrating a user system to which a storage device according to an embodiment of the present disclosure is applied.

Referring to FIG. 15, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A computing system comprising:
    a storage device including a plurality of zones; and
    a host configured to receive storage area information including an optimal write size of an open zone among the plurality of zones from the storage device, update a history size by accumulating a value for data previously flushed to the storage device, determine a target size of data to be flushed to the storage device based on the optimal write size, the history size, and a size of buffer data of the host, and flush data having the target size among the buffer data to the storage device.

2. The computing system of claim 1, wherein the host comprises:
    a host buffer configured to store the buffer data; and
    a flush controller configured to determine the target size based on the optimal write size, the history size, and the size of the buffer data, and flush the data having the target size among the buffer data to the storage device,
    wherein the history size is initialized whenever the history size reaches the optimal write size.

3. The computing system of claim 2, wherein the flush controller sets the target size based on the history size and the optimal write size, and adjusts the target size based on a comparison result of the target size and the size of the buffer data.

4. The computing system of claim 3, wherein the flush controller sets a value obtained by subtracting the history size from the optimal write size as an initial value of the target size.

5. The computing system of claim 4, wherein when the size of the buffer data is less than the target size, the flush controller initializes a value of the target size, when the size of the buffer data is the same as the target size, the flush controller maintains the value of the target size, and when the size of the buffer data is greater than the target size, the flush controller adjusts the value of the target size to a value obtained by adding an integer multiple of the optimal write size and the initial value of the target size within the size of the buffer data.

6. The computing system of claim 2, wherein the flush controller provides a sync up request to the storage device in response to a sync up event synchronizing the host and the storage device, and flushes the buffer data to the storage device.

7. The computing system of claim 1, wherein the storage device comprises:
   a memory device including the plurality of zones; and
   a memory controller configured to store data flushed from the host and program the data in the open zone.

8. The computing system of claim 7, wherein the memory device includes a plurality of zone buffers respectively corresponding to the plurality of zones,
   the plurality of zone buffers includes a memory cell that stores fewer data bits per memory cell than a memory cell included in the plurality of zones.

9. The computing system of claim 8, wherein the memory controller comprises:
   a write buffer configured to store the data flushed from the host; and
   a memory operation controller configured to program the data stored in the write buffer to the open zone or a zone buffer corresponding to the open zone.

10. The computing system of claim 9, wherein the memory operation controller programs the data stored in the write buffer into the open zone or the zone buffer based on a comparison result of the optimal write size and a size of the data stored in the write buffer.

11. The computing system of claim 10, wherein the memory operation controller programs data having the optimal write size among the data stored in the write buffer to the open zone when the data stored in the write buffer is greater than or equal to the optimal write size.

12. The computing system of claim 10, wherein the memory operation controller receives a sync up request from the host, and programs the data stored in the write buffer to the zone buffer when the data stored in the write buffer is less than the optimal write size.

13. The computing system of claim 12, wherein the memory operation controller loads the data stored in the zone buffer to the write buffer, and programs the data having the optimal write size among write buffer data to the open zone, and
   the write buffer data includes data loaded from the zone buffer to the write buffer and data newly flushed from the host.

14. A method of operating a host that controls a storage device including a plurality of zones, the method comprising:
   receiving storage area information including an optimal write size of an open zone among the plurality of zones from the storage device;
   updating a history size by accumulating a value for data previously flushed to the storage device;
   determining a target size of data to be flushed to the storage device based on the optimal write size, the history size, and a size of buffer data of the host; and
   flushing data having the target size among the buffer data to the storage device.

15. The method of claim 14, wherein determining the target size comprises:
   setting the target size based on the optimal write size and the history size; and
   adjusting the target size based on a comparison result of the target size and the size of the buffer data.

16. The method of claim 15, wherein setting the target size comprises setting a value obtained by subtracting the history size from the optimal write size as an initial value of the target size.

17. The method of claim 16, wherein adjusting the target size comprises initializing a value of the target size when the size of the buffer data is less than the target size, maintaining the value of the target size when the size of the buffer data is the same as the target size, and adjusting the value of the target size to a value obtained by adding an integer multiple of the optimal write size and the initial value of the target size within the size of the buffer data when the size of the buffer data is greater than the target size.

18. The method of claim 14, further comprising, before the flushing, providing a sync up request to the storage device in response to a sync up event for synchronizing the host and the storage device.

19. An operating method for a host device, the operating method comprising:
   buffering data while a size of the buffered data stays expressed as the following Equation 1; and
   flushing, into a storage device, at least a part of the buffered data,
   wherein a size of the part is an amount expressed as the following Equation 2:

$$A > B, \text{ where} \quad \text{[Equation 1]}$$

'A' represents a size of data that can be flushed into the storage device within an optimal write capacity of the storage device, A being C-D,
   'B' represents the size of the buffered data,
   'C' represents the optimal write capacity,
   'D' represents the size of data that is previously flushed from the buffer into the storage device within the optimal write capacity, D being E mod C, and
   'E' represents a size of data that is previously flushed from the buffer into the storage device, and $$A \leq F \leq B \text{ while } A \leq B, \text{ where } 'F' \text{ represents the size of the part} \quad \text{[Equation 2]}.$$

20. The operating method of claim 19, wherein the size of the part is an amount expressed as follows:
   $F = \alpha C + A$, where '$\alpha$' represents an integer of zero (0) or greater.

* * * * *